United States Patent
Kadoya et al.

(10) Patent No.: US 12,194,994 B2
(45) Date of Patent: Jan. 14, 2025

(54) TRAVELING ROUTE GENERATION APPARATUS, TRAVELING ROUTE GENERATION METHOD, VEHICLE CONTROL APPARATUS, AND VEHICLE CONTROL METHOD

(71) Applicant: Mitsubishi Electric Corporation, Tokyo (JP)

(72) Inventors: Fumiaki Kadoya, Tokyo (JP); Junichi Okada, Tokyo (JP); Yuki Yoshida, Tokyo (JP); Akihiko Hiraoka, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 251 days.

(21) Appl. No.: 17/638,072

(22) PCT Filed: Sep. 25, 2019

(86) PCT No.: PCT/JP2019/037562
§ 371 (c)(1),
(2) Date: Feb. 24, 2022

(87) PCT Pub. No.: WO2021/059392
PCT Pub. Date: Apr. 1, 2021

(65) Prior Publication Data
US 2022/0274595 A1    Sep. 1, 2022

(51) Int. Cl.
*B60W 30/10*    (2006.01)
*B60W 40/06*    (2012.01)
(Continued)

(52) U.S. Cl.
CPC ............ *B60W 30/10* (2013.01); *B60W 40/06* (2013.01); *B60W 40/105* (2013.01);
(Continued)

(58) Field of Classification Search
CPC .... B60W 30/10; B60W 40/06; B60W 40/105; B60W 40/12; B60W 2556/40; B60W 2556/50; G01C 21/26; G01C 21/28
(Continued)

(56) References Cited

U.S. PATENT DOCUMENTS

2007/0239347 A1*  10/2007  Watanabe ............... G01C 21/28
                                                     701/469
2014/0244153 A1*   8/2014  Dorum ............... G01C 21/3632
                                                     701/409
(Continued)

FOREIGN PATENT DOCUMENTS

JP    2006-138835 A       6/2006
JP    2007155493 A  *    6/2007
(Continued)

OTHER PUBLICATIONS

International Search Report for PCT/JP2019/037562 dated Dec. 3, 2019.
(Continued)

*Primary Examiner* — Scott A Reinbold
(74) *Attorney, Agent, or Firm* — Sughrue Mion, PLLC; Richard C. Turner

(57) ABSTRACT

To provide a traveling route generation apparatus and a traveling route generation method which can suppress generation of the traveling route with bad interpolation accuracy, and can generates the traveling route with good interpolation accuracy, when generating the traveling route of the vehicle. To provide a vehicle control apparatus and a vehicle control method which can control the traveling of vehicle based on the traveling route generated above. A traveling route generation apparatus and a traveling route generation method compares the two traveling positions and the two traveling directions which are temporally before and after relation, and determines whether to interpolate between the
(Continued)

two traveling positions, and generates the traveling route which interpolates between the two traveling positions determined to interpolate, when it is determined to interpolate.

4 Claims, 8 Drawing Sheets

(51) Int. Cl.
    *B60W 40/105* (2012.01)
    *B60W 40/12* (2012.01)
(52) U.S. Cl.
    CPC ......... *B60W 40/12* (2013.01); *B60W 2556/40* (2020.02); *B60W 2556/50* (2020.02)
(58) Field of Classification Search
    USPC .......................................................... 701/41
    See application file for complete search history.

(56) References Cited

U.S. PATENT DOCUMENTS

| 2016/0052547 A1* | 2/2016 | Kashiwai ............. B62D 15/021 701/41 |
| 2018/0039284 A1 | 2/2018 | Hitosugi et al. |
| 2018/0364736 A1 | 12/2018 | Hitosugi et al. |

FOREIGN PATENT DOCUMENTS

| JP | 5157067 B2 | 3/2013 |
| JP | 2014-218098 A | 11/2014 |
| JP | 6395771 B2 | 9/2018 |

OTHER PUBLICATIONS

Written Opinion for PCT/JP2019/037562 dated Dec. 3, 2019.
Notice of Reasons for Refusal dated Aug. 30, 2022 from the Japanese Patent Office in Japanese Application No. 2021-548040.
Office Action issued Jun. 17, 2024 in Chinese Application No. 201980100415.7.

* cited by examiner

TRAVELING ROUTE GENERATION APPARATUS, TRAVELING ROUTE GENERATION METHOD, VEHICLE CONTROL APPARATUS, AND VEHICLE CONTROL METHOD

CROSS REFERENCE TO RELATED APPLICATIONS

This application is a National Stage of International Application No. PCT/JP2019/037562 filed Sep. 25, 2019.

TECHNICAL FIELD

The present disclosure relates to a traveling route generation apparatus, a traveling route generation method, a vehicle control apparatus, and a vehicle control method.

BACKGROUND ART

In the conventional traveling route generation apparatus, the receiving apparatus mounted on the vehicle receives satellite signals, such as GPS (Global Positioning Satellite) and quasi-zenith satellite, and obtains position of vehicle information. The conventional vehicle control apparatus performs steering control of the vehicle, by combining the position information of road used for the target course with the position of vehicle information.

On the other hand, the traveling route generation apparatus obtains the traveling position information which is obtained when the vehicle travels the actual road, for example. Furthermore, the traveling route generation apparatus obtains the position information of the road where the vehicle travels, from the road map data and the like. When the traveling route obtained from traveling position information and the road shape obtained from the position information of the road are not similar, the traveling route generation apparatus estimates a road shape about an interval which is not similar, using the traveling position (for example, PLT 1, PLT 2).

CITATION LIST

Patent Literature

PLT 1: JP 5157067 B
PLT 2: JP 6395771 B

SUMMARY OF INVENTION

Technical Problem

Generally, the position information of the road used as the target course is obtained from the road map data provided in the car-navigation system, or the high precision map data called the dynamic map. However, maintenance of these map data requires a huge amount of time and costs, because the map data of the range where the vehicle can move becomes enormous.

The structure and the shape of road may change locally by construction. Even if the map data is updated each time, a time lag may occur. Moreover, development of the traveling service which utilizes the automatic driving vehicle is expected in the future. Especially, operation in the depopulated area is considered to become a large demand. It can be supposed that, for preparing high precision map data in such area, map data becomes enormous even within Japan, and map data becomes larger if foreign countries are also included.

In the conventional technology, when the traveling position of the vehicle is compared with the position information of the road already stored in the car navigation apparatus and the like and there is a difference, the position information of the road is updated by processing the traveling position of actual traveling. And, in the conventional technology, the position information of the road is updated using the road information obtained from the periphery monitoring devices (camera, radar, and the like) mounted on the vehicle.

These methods are methods of updating to the detected road state, on the basis of the position information of the existing road. However, these methods cannot be performed in the place where the road information is poor and the place where the position information of the existing road cannot be obtained.

Then, the inventor of the present disclosure is developing the method of generating the position information of the road, in the place where the road information is poor (for example, country farm road), or the place where the position information of the existing road cannot be obtained (for example, highland and unpaved road where map is not prepared), based on the traveling position of the vehicle detected using the satellite positioning information, the detection information of the periphery monitoring device, and the like, without depending on the road map data. However, in the case of using the satellite positioning information, when there is an upper obstacle, such as a viaduct, a ceiling of tunnel, a building, or a mountain, on upper side of the vehicle, a traveling interval where the satellite positioning information cannot be obtained and the traveling position of the vehicle cannot be obtained occurs. Or, in the case of using the periphery monitoring device, when the information for determining the position is not obtained from the periphery of the vehicle, the traveling interval where the traveling position of the vehicle cannot be obtained occurs. In such cases, it is considered to interpolate the traveling position of the traveling interval where the traveling position cannot be obtained, based on before and after traveling positions where the traveling position can be obtained. However, when the shape of the traveling interval where the traveling position cannot be obtained is curved, the accuracy of the interpolated traveling position may become worse. The above automatic driving cannot be performed using the inaccurate interpolation traveling position.

Then, in the present disclosure, when generating the traveling route of the vehicle based on the detected traveling position of the vehicle without depending on the road map data, it is desired to provide a traveling route generation apparatus and a traveling route generation method which can suppress generation of the traveling route with bad interpolation accuracy, and can generates the traveling route with good interpolation accuracy, for example, in the traveling interval where the traveling position cannot be detected. Then, in the present disclosure, it is desired to provide a vehicle control apparatus and a vehicle control method which can control the traveling of vehicle, based on the traveling route where the generation of the traveling route with bad interpolation accuracy was suppressed and the traveling route with good interpolation accuracy was generated.

Solution to Problem

A traveling route generation apparatus according to the present disclosure, including:
  a traveling information acquisition unit that obtains traveling positions and traveling directions, of one object vehicle, which were detected in time series;
  a traveling information comparison unit that compares the two traveling positions and the two traveling directions which are temporally before and after relation, and determines whether to interpolate between the two traveling positions; and
  a traveling route generation unit that generates a traveling route which interpolates between the two traveling positions determined to interpolate, when it is determined to interpolate.

A traveling route generation method according to the present disclosure, including:
  a traveling information acquisition step that obtains traveling positions and traveling directions, of one object vehicle, which were detected in time series;
  a traveling information comparison step that compares the two traveling positions and the two traveling directions which are temporally before and after relation, and determines whether to interpolate between the two traveling positions; and
  a traveling route generation step that generates a traveling route which interpolates between the two traveling positions determined to interpolate, when it is determined to interpolate.

A vehicle control apparatus according to the present disclosure, including:
  a vehicle control unit that controls traveling of vehicle, based on the traveling route generated by the traveling route generation apparatus.

A vehicle control method according to the present disclosure, including:
  a vehicle control step that controls traveling of vehicle, based on the traveling route generated by the traveling route generation method.

Advantage of Invention

According to the traveling route generation apparatus and the traveling route generation method of the present disclosure, by comparing the two traveling positions and the two traveling directions which are temporally before and after relation, it can be determined whether the trend of the traveling route interval between the two traveling information changes largely from the trend of the traveling route before and after the two traveling information, and whether the traveling route interval between the two traveling positions is long. Accordingly, it can be determined whether the accuracy of the interpolated traveling position becomes worse if the part between the two traveling positions is interpolated. Therefore, for example, when there is a traveling interval where the traveling position cannot be detected, the generation of the traveling route with bad interpolation accuracy can be suppressed, and the traveling route with good interpolation accuracy can be generated. Then, according to the vehicle control apparatus and the vehicle control method of the present disclosure, since the traveling of vehicle can be controlled based on the traveling route where the generation of the traveling route with bad interpolation accuracy was suppressed and the traveling route with good interpolation accuracy was generated, control accuracy can be improved.

DETAILED DESCRIPTION OF THE EMBODIMENTS

1. Embodiment 1

Figure 1:
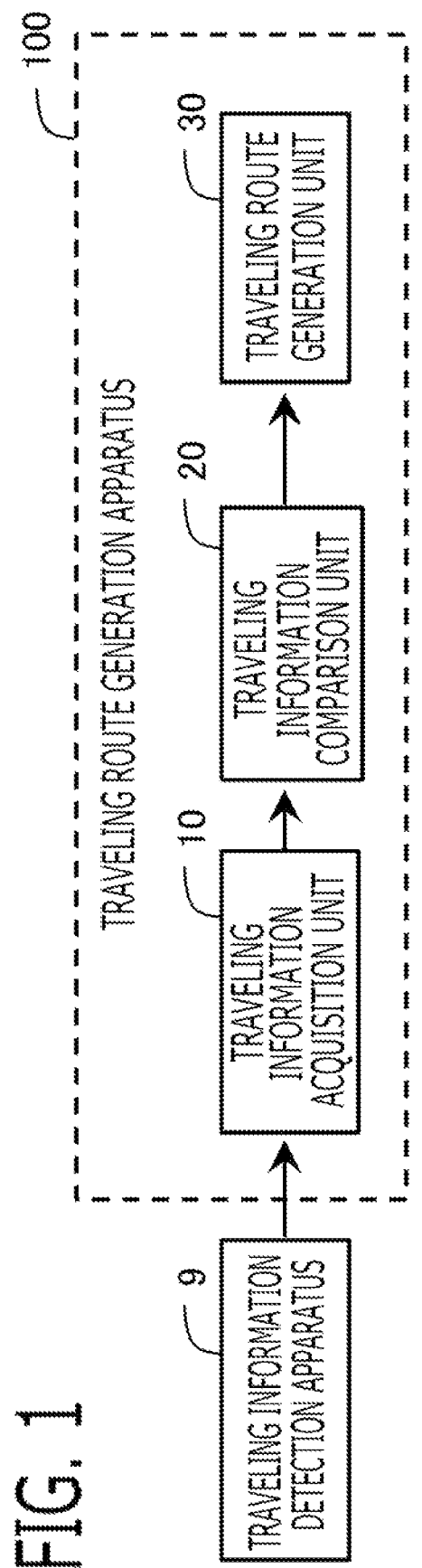
FIG. 1 is a block diagram of the traveling route generation apparatus according to Embodiment 1.

A traveling route generation apparatus 100 and a traveling route generation method according to Embodiment 1 will be explained with reference to drawings. FIG. 1 is a block diagram of the traveling route generation apparatus 100. The traveling route generation apparatus 100 is provided with processing units, such as a traveling information acquisition unit 10, a traveling information comparison unit 20, and a traveling route generation unit 30.

1-1. Information Processing Apparatus

Figure 2:
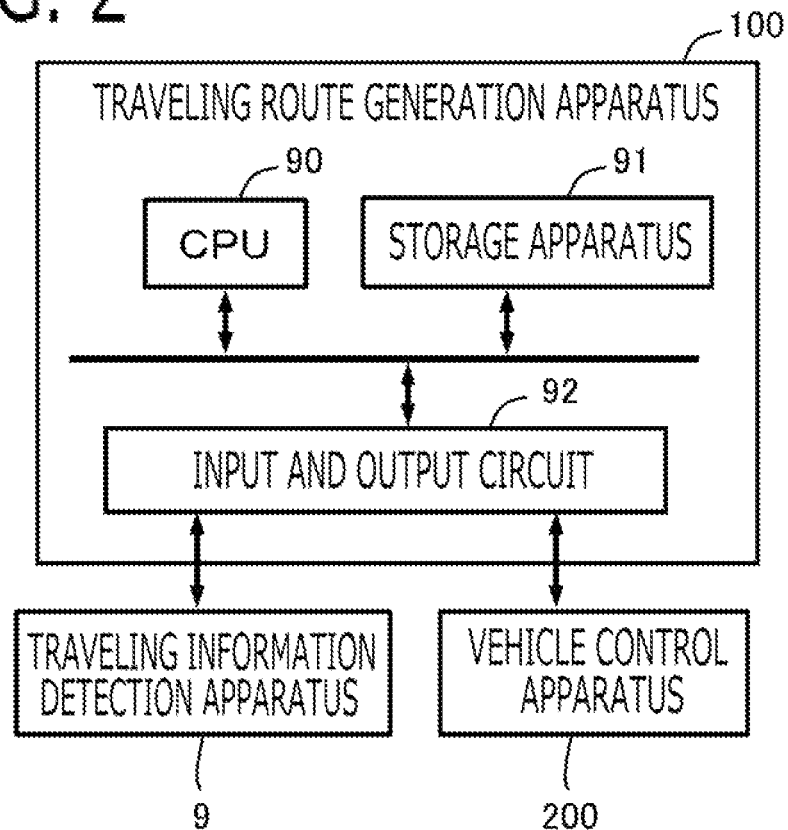
FIG. 2 is a hardware configuration figure of the traveling route generation apparatus according to Embodiment 1.

In the present embodiment, each processing units 10 to 30 of the traveling route generation apparatus 100 are realized by processing circuits included in the traveling route generation apparatus 100. For example, as shown in FIG. 2, the traveling route generation apparatus 100 is provided, as the processing circuits, with an arithmetic processor (computer) 90 such as a CPU (Central Processing Unit), storage apparatuses 91 which exchange data with the arithmetic processor 90, an input and output circuit 92 which inputs and outputs signals between the arithmetic processor 90 and the external apparatus, and the like.

As the arithmetic processor 90, DSP (Digital Signal Processor), a neural processing chip, ASIC (Application Specific Integrated Circuit), IC (Integrated Circuit), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, non-volatile or volatile semiconductor memories, such as RAM (Random Access Memory), ROM (Read Only Memory), EPROM (Erasable Programmable Read Only Memory), and EEPROM (Electrically Erasable Programmable Read Only Memory), are used. Or, as the storage apparatuses 91, an apparatus using a storage media, such as a magnetic disk and DVD, may be used. The input and output circuit 92 is provided with a communication circuit, an A/D converter, a driving circuit, and the like. As the external apparatus, the traveling information detection apparatus 9, the vehicle control apparatus 200, and the like are provided.

Then, the arithmetic processor 90 runs software items (programs) stored in the storage apparatus 91 such as a ROM and collaborates with other hardware devices, such as the storage apparatuses 91, the input and output circuit 92, and the external apparatus, so that the respective functions of the processing units 10 to 30 provided in the traveling route generation apparatus 100 are realized. Setting data items, such as the permission range of distance and the permission range of direction difference, to be utilized in the processing units 10 to 30 are stored, as part of software items (programs), in the storage apparatus 91 such as a ROM.

Figure 3:
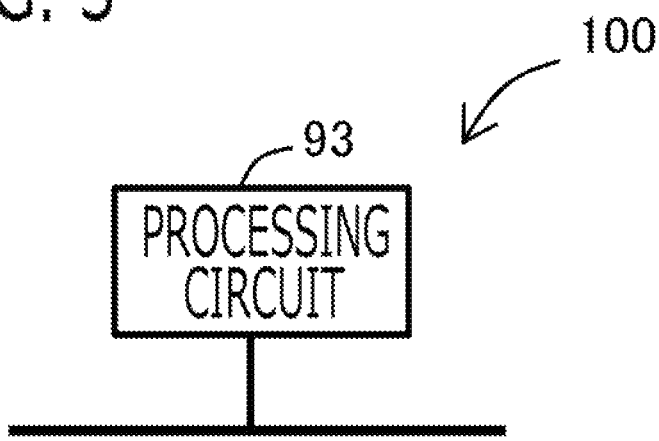
FIG. 3 is a hardware configuration figure of the traveling route generation apparatus according to Embodiment 1.

Alternatively, as shown in FIG. 3, the traveling route generation apparatus 100 may be provided with a dedicated hardware 93 as the processing circuit, for example, a single circuit, a combined circuit, a programmed processor, a parallel programmed processor, a neural processing chip, ASIC, FPGA, or a circuit which combined these.

1-2. Traveling Information Detection Apparatus 9

The traveling information detection apparatus 9 is an apparatus which detects traveling information of the own vehicle in time series. In the traveling information, a traveling position is included at least. In the traveling position, a traveling position detected based on satellite positioning information is included. The traveling information detection apparatus 9 includes a satellite positioning unit which receives signals outputted from satellites, such as GNSS (Global Navigation Satellite System), by a receiver (antenna) and detects a position of vehicle. The position of vehicle is latitude, longitude, altitude, and the like. The traveling information detection apparatus 9 calculates a positioning accuracy of the detected position. A time information is also included in the received satellite signal, and the satellite positioning unit also obtains the time information when the position of vehicle is detected.

The satellite positioning unit detects the position of vehicle with high accuracy by RTK (Real Time Kinematic) positioning, for example. In RTK positioning, a distance between the satellite and the receiver (antenna) of the satellite positioning unit is calculated using wave number and phase difference of the radio wave (carrier wave) transmitted from the satellite, and the own position of the satellite positioning unit is calculated. In RTK positioning, at the reference station whose position is fixed and at the satellite positioning unit (mobile station) of the vehicle, positions are measured at the same time. And, data measured at the reference station is transmitted to the satellite positioning unit of the vehicle by the wireless communication and the like, and the position of the satellite positioning unit is detected. RTK positioning realizes positioning accuracy of several centimeters or less. For example, PLT 2 describes the detailed method of detecting the position of moving vehicle with high accuracy by RTK positioning. The satellite positioning unit may detect the position of vehicle by various kinds of positioning methods, such as an independent positioning method and a relative positioning method. A vehicle speed sensor, an acceleration sensor, and an azimuth sensor may be included in the traveling information detection apparatus 9.

The traveling information detection apparatus 9 may include a periphery monitoring device which monitors vehicle periphery, such as a front camera. Then, the traveling information detection apparatus 9 may detect the position of vehicle additionally based on the detection information of the periphery monitoring device. For example, when detecting a road sign, a road marking, a road guide information, and the like from the imaging data of the front camera, the traveling information detection apparatus 9 may refer to map data, and may detect the position of vehicle additionally, based on the position information where the corresponding road sign, road marking, and road guide information are located.

The traveling information detection apparatus 9 detects the traveling position of the vehicle discretely (for example, at a preliminarily set measurement period), and detects a detection time when the traveling position is detected. As described later, when the traveling information detection apparatus 9 cannot receive signals of the satellites due to an upper obstacle, the traveling position is not detected, and data during this period is missing.

The traveling information detection apparatus 9 may calculate the traveling direction of the vehicle of each detection time at each detection time, based on a difference between the traveling position of each detection time, and the traveling position of the detection time before and after each detection time. The traveling direction is an azimuth of the advancing direction of the vehicle, for example, it is an angle of the advancing direction of the vehicle on the basis of north. The traveling information detection apparatus 9 may calculate the travelling speed of the vehicle of each detection time at each detection time, based on a difference between the traveling position and the detection time of each detection time, and the traveling position and the detection time before and after each detection time. If the vehicle speed sensor, the acceleration sensor, and the azimuth sensor are included in the traveling information detection apparatus 9, the traveling direction and the travelling speed may be detected by each sensor.

The traveling information detection apparatus 9 generates traveling information data of time series which consists of a plurality of the traveling information and the detection time which were detected discretely. The traveling position is included in the traveling information at least. The positioning accuracy of the traveling position, the traveling direction, and the travelling speed may be included in the traveling information.

1-3. Traveling Information Acquisition Unit 10

The traveling information acquisition unit 10 obtains traveling positions and traveling directions of one object vehicle (in this example, the own vehicle), which were detected in time series. The traveling information acquisition unit 10 obtains the traveling positions of the object vehicle, which were detected in time series based on the satellite positioning information. Information other than the satellite positioning information, such as the traveling position detected based on the detection information of the periphery monitoring device, may be included in the traveling positions to be obtained.

In the present embodiment, the traveling information acquisition unit 10 obtains the traveling information data of time series which consists of the plurality of traveling information and detection time from the traveling information detection apparatus 9. As mentioned above, the traveling position is included in traveling information at least. In the traveling position, the positioning accuracy (for example, a maximum distance error) of the traveling position may be included. The traveling information acquisition unit 10 may delete the traveling position whose accuracy is worse than a determination threshold, so as not to be used for the determination of interpolation and the generation of traveling route which are described below.

When the traveling direction is not included in the obtained traveling information, the traveling information acquisition unit 10 calculates the traveling direction of the vehicle of each detection time at each detection time, based on a difference between the traveling position of each detection time, and the traveling position of the detection time before and after each detection time. When the travelling speed is not included in the obtained traveling information, the traveling information acquisition unit 10 calculates the travelling speed of the vehicle of each detection time at each detection time, based on a difference between the traveling position and the detection time of each detection time, and the traveling position and the detection time of the detection time before and after each detection time.

1-4. Traveling Information Comparison Unit 20

<Detection Missing of Traveling Information>

When there is an upper obstacle, such as a viaduct, a ceiling of tunnel, a building, or a mountain, on upper side or diagonal upper side of the vehicle, the traveling information detection apparatus 9 cannot receive signals of the satellites, and cannot detect the traveling position, or the accuracy of the traveling position is bad and it cannot be used for generation of the traveling route. Therefore, detection missing of the traveling information may occur in the traveling information data of time series.

Figure 4:
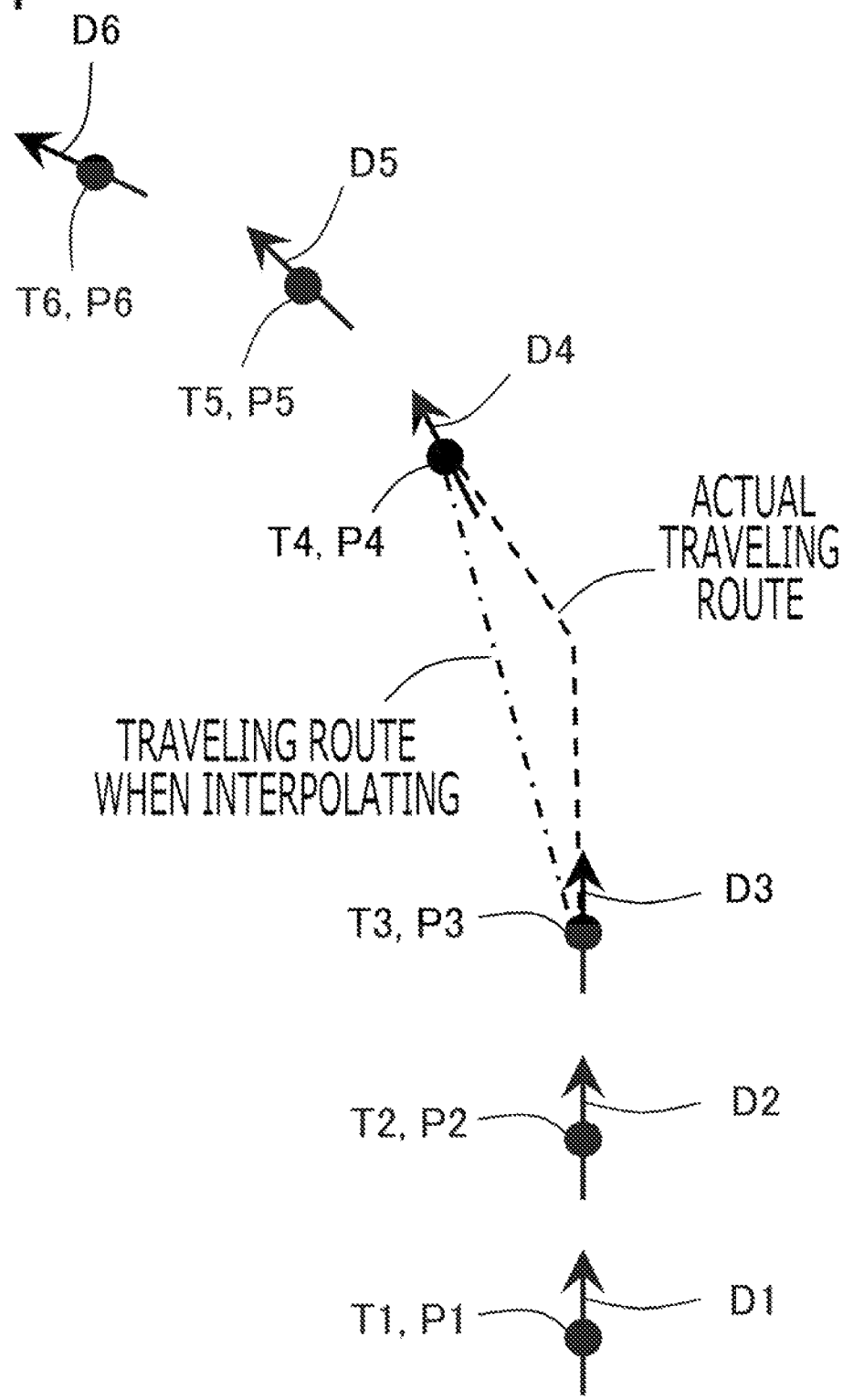
FIG. 4 is a schematic diagram for explaining the traveling information of time series according to Embodiment 1.
Figure 5:
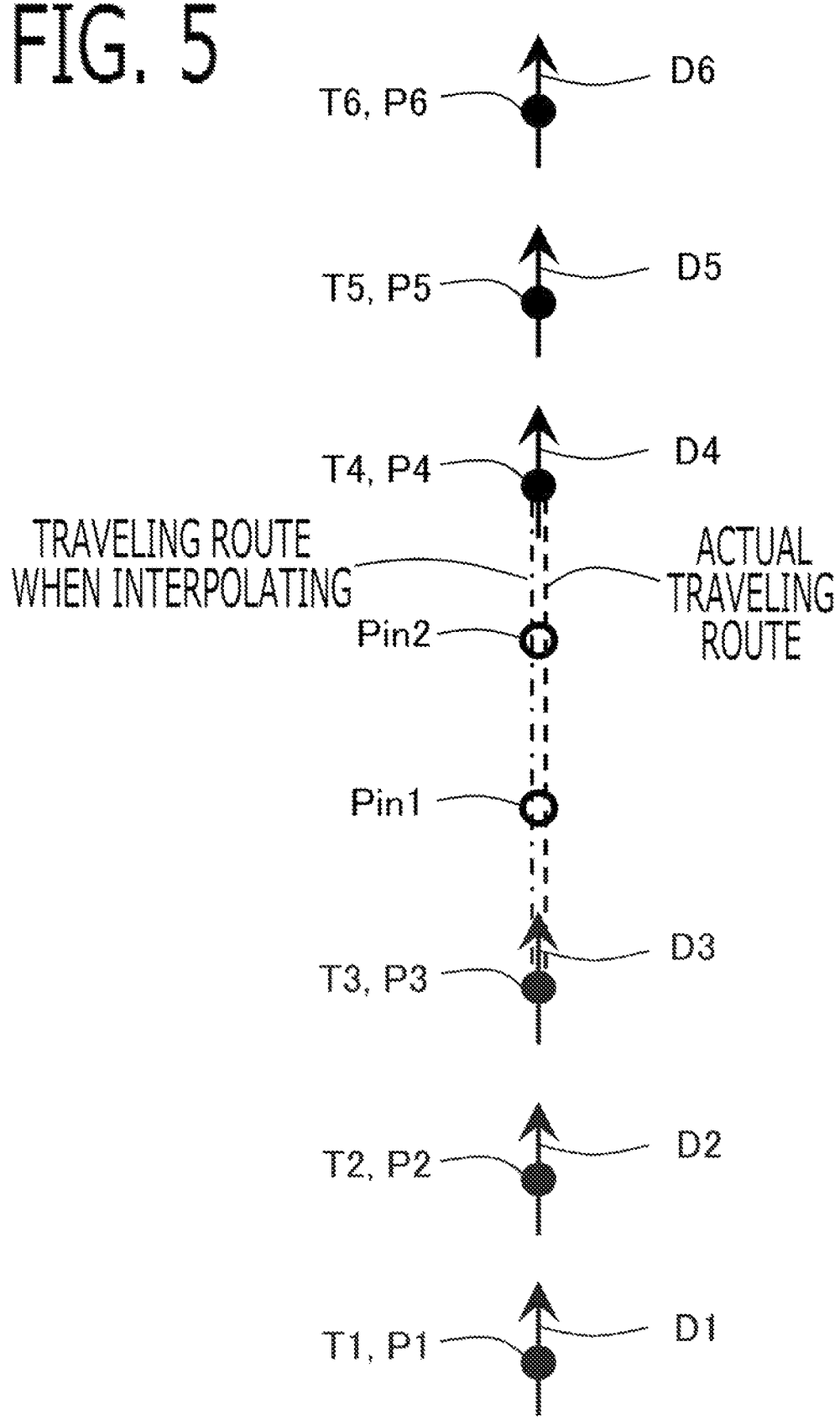
FIG. 5 is a schematic diagram for explaining the traveling information of time series according to Embodiment 1.

FIG. 4 and FIG. 5 show example of the obtained traveling positions P1, P2, . . . of time series, the obtained traveling directions D1, D2, . . . of time series, and the obtained detection times T1, T2, . . . of time series. Between the detection times T3 and T4, the detection missing of the traveling information occurs due to the upper obstacle and the like, and the distance between the traveling positions P3 and P4 becomes longer than the distances of other intervals. The intervals of the detection times other than the interval of the detection times T3 and T4 become a constant measurement period by the traveling information detection apparatus 9. In the example of FIG. 4, there is a curve of road and the like between the detection times T3 and T4, the trend of the traveling route changed largely before and after the detection missing between the detection times T3 and T4. In the example of FIG. 5, the road between the detection times T3 and T4 is also a straight road, the trend of the traveling route did not change much before and after the detection missing between the detection times T3 and T4.

It is required to interpolate such detection missing of the traveling information and generate the traveling route. However, when the trend of the actual traveling route interval where the detection missing of the traveling information occurs changed largely from the trend of the traveling route before and after the detection missing like the example of FIG. 4, or when the traveling route interval where the detection missing of the traveling information occurs is long, the accuracy of the interpolated traveling information may become worse. Therefore, when it is predicted that the accuracy of the interpolated traveling information becomes worse, it is better not to interpolate the traveling information. On the other hand, when the trend of the actual traveling route interval where the detection missing of the traveling information occurs did not change much from the trend of the traveling route before and after the detection missing like the example of FIG. 5, or when the traveling route interval where the detection missing of the traveling information occurs is short, the accuracy of the interpolated traveling information becomes good. Therefore, when it is predicted that the accuracy of the interpolated traveling information becomes good, the traveling information can be interpolated.

<Configuration of Traveling Information Comparison Unit 20>

Then, the traveling information comparison unit compares the two traveling positions and the two traveling directions which are temporally before and after relation, and determines whether to interpolate between the two traveling positions.

According to this configuration, by comparing the two traveling positions and the two traveling directions which are temporally before and after relation, it can be determined whether the trend of the traveling route interval between the two traveling information changed largely from the trend of the traveling route before and after the two traveling information, and it can be determined whether the traveling route interval between the two traveling positions is long. Accordingly, it can be determined whether the accuracy of the interpolated traveling position becomes worse if the part between the two traveling positions is interpolated, and it can be determined with good accuracy whether to interpolate between the two traveling positions.

In the present embodiment, the traveling information comparison unit 20 calculates a distance between the two traveling positions and a direction difference between the two traveling directions which are temporally before and after relation; when the distance between the two traveling positions is within a permission range of distance and the direction difference between the two traveling directions is within a permission range of direction difference, determines to interpolate between the two traveling positions; and otherwise, determines not to interpolate between the two traveling positions.

According to this configuration, by a simple calculation that calculates the distance between the two traveling positions, determines whether the distance is within the permission range of distance, calculates the direction difference between the two traveling directions, and determines whether the direction difference is within the permission range of direction difference, it can be determined whether to interpolate. When the distance between the two traveling positions is within the permission range of distance and the direction difference between the two traveling directions is within the permission range of direction difference, it can be determined that the trend of the traveling route interval between the two traveling information did not change largely from the trend of the traveling route before and after the two traveling information, and the traveling route interval between the two traveling positions is not long. Accordingly, it can be determined with good accuracy by the simple calculation whether to interpolate between the two traveling positions.

<Setting of Permission Range of Distance>

A lower limit distance Lmin and an upper limit distance Lmax of the permission range of distance are set to preliminarily set fixed values. The lower limit distance Lmin is set to a distance that unnecessary interpolation is not performed when the two traveling positions are close. The lower limit distance Lmin may be set to a minimum distance required for vehicle control, such as automatic driving described below. The upper limit distance Lmax is set to a distance that the traveling route interval between the two traveling positions where interpolation is permitted does not become long too much. The traveling information comparison unit 20 determines whether the distance between the two traveling positions is between the lower limit distance Lmin and the upper limit distance Lmax.

Alternatively, so as not to interpolate between two traveling positions when there is no detection missing of the traveling information, the lower limit distance Lmin of the permission range of distance may be set larger than the distance between the two traveling positions when there is no detection missing of the traveling information. For example, the traveling information comparison unit 20 sets the lower limit distance Lmin of the permission range of distance, based on a preliminarily set reference time difference ΔT between the detection times of the two traveling positions and the two traveling directions, and the travelling speed Vs of the own vehicle. Herein, the reference time difference ΔT is set to a standard time difference between the two detection times when there is no detection missing of the traveling information, for example. As the standard time difference, an average value of the time differences, a highest frequency value of the time differences, or a measurement period of the traveling information detection apparatus 9 is used. For example, as shown in the next equation, the traveling information comparison unit 20 sets the lower limit distance Lmin to a value obtained by multiplying a travelling speed Vs related to the two traveling information (for example, an average value of the two travelling speeds), and a setting coefficient Kmin set to a value larger than 1 (for example, 1.5), to the reference time difference ΔT.

$$Lmin = Kmin \times Vs \times \Delta T \quad (1)$$

Alternatively, the lower limit distance Lmin may be set to a distance such that interpolation is permitted even when there is no detection missing of the traveling information due to the upper obstacle and the like.

Figure 6:
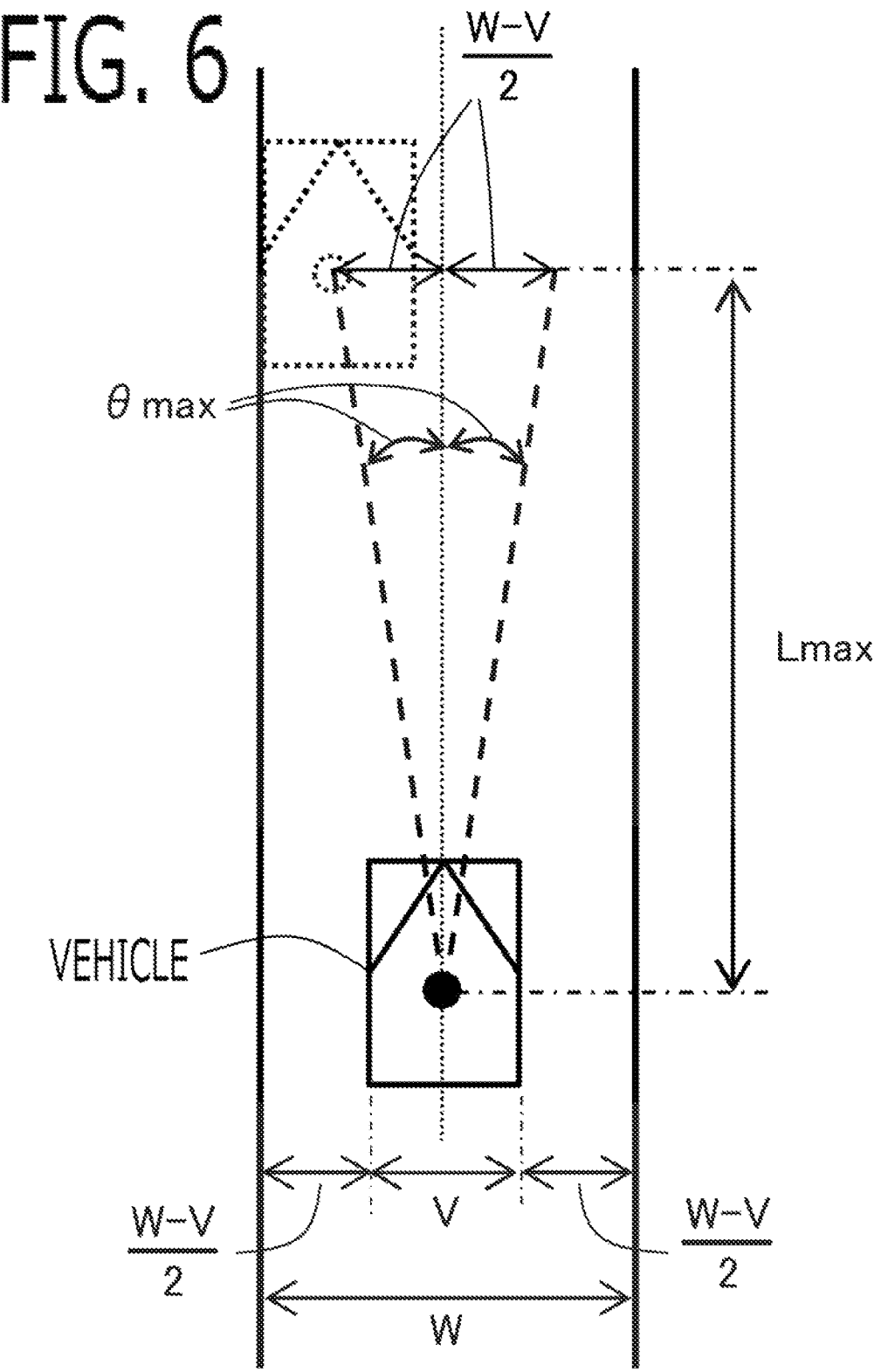
FIG. 6 is a figure for explaining setting of the upper limit distance according to Embodiment 1.

The traveling information comparison unit 20 may set the upper limit distance Lmax of the permission range of distance, based on a lateral margin width ΔW (=W−V) obtained by subtracting a width V of the own vehicle from a road width W, and an upper limit direction difference θmax of the permission range of direction difference. For example, as shown in FIG. 6, the traveling information comparison unit 20 sets the upper limit distance Lmax using the next equation, based on the lateral margin width ΔW and the upper limit direction difference θmax.

$$Lmax = \Delta W/2/\tan(\theta max)$$

$$\Delta W = W - V \quad (2)$$

The road width W may be set to a standard road width, it may be set to a road width detected by the periphery monitoring device, such as the front camera, or it may be set to a road width obtained from map data. As the width V of the own vehicle, a width of standard vehicle may be used, or a width set for each vehicle may be used.

If the lateral margin width ΔW and the upper limit direction difference θmax are preliminarily set fixed values, the upper limit distance Lmax may be a preliminarily set fixed value by the equation (2).

<Setting of Permission Range of Direction Difference>

The upper limit direction difference θmax of the permission range of direction difference is set to a preliminarily set fixed value. The traveling information comparison unit 20 determines whether an absolute value of the direction difference (in this example, angular difference) of the two traveling directions is less than or equal to the upper limit direction difference θmax set to a positive value. The upper limit direction difference θmax is set considering a trend difference between the traveling routes before and after the part where interpolation is permitted. If the upper limit direction difference θmax is enlarged, the trend difference between the traveling routes before and after the part where interpolation is permitted becomes large, and the traveling route whose curve is larger is also interpolated. If the upper limit direction difference θmax is made small, the trend difference between the traveling routes before and after the part where interpolation is permitted becomes small, and the traveling route whose curve is smaller is interpolated.

In the example of FIG. 4, between the detection time T3 and the detection time T4, the detection missing of the traveling information occurs due to the upper obstacle and the like. But, there is a curve of road and the like between the detection time T3 and the detection time T4, and the direction difference between the traveling direction D3 at the detection time T3 and the traveling direction D4 at the detection time T4 becomes out of the permission range of direction difference. Accordingly, it is determined not to interpolate between the traveling position P3 at the detection time T3, and the traveling position P4 at the detection time T4. If the part between the traveling position P3 and the traveling positions P4 is interpolated linearly, the interpolated traveling route deviates from the actual traveling route which curved at the specific position. Accordingly, it is determined appropriately not to interpolate.

On the other hand, other than between the detection time T3 and the detection time T4, the detection missing of the traveling information does not occur, the distance between each two traveling positions becomes shorter than the lower limit distance Lmin, and it is also determined not to interpolate between each two traveling positions other than between the traveling position P3 and the traveling position P4. Therefore, when the missing of traveling information does not occur and there is no necessity for interpolation, it is determined appropriately not to interpolate.

In the example of FIG. 5, the detection missing of the traveling information occurs due to the upper obstacle and the like between the detection time T3 and the detection time T4. But, the part between the detection time T3 and the detection time T4 is also the straight road, and the direction difference between the traveling direction D3 at the detection time T3 and the traveling direction D4 at the detection time T4 becomes within the permission range of direction difference. The distance between the traveling position P3 at the detection time T3 and the traveling position P4 at the detection time T4 also becomes within the permission range of distance. Accordingly, it is determined to interpolate between the traveling position P3 and the traveling positions P4. Even if the part between the traveling position P3 and the traveling position P4 is interpolated linearly, since the interpolated traveling route does not deviate from the straight actual traveling route, it is determined appropriately to interpolate. On the other hand, the detection missing of the traveling information does not occur other than between the detection time T3 and the detection time T4, and it is determined not to interpolate similar to the example of FIG. 4.

1-5. Traveling Route Generation Unit 30

When it is determined by the traveling information comparison unit 20 to interpolate, the traveling route generation unit 30 generates the traveling route which interpolates between the two traveling positions determined to interpolate.

According to this configuration, for example, even if detection missing occurs between the two traveling positions, when it is determined to interpolate as mentioned above, the traveling route which interpolates between the two traveling positions can be generated with good accuracy.

In the present embodiment, when it is determined to interpolate, the traveling route generation unit 30 adds an interpolation traveling position which is a traveling position which interpolates between the two traveling positions determined to interpolate. The traveling route generation unit 30 generates a traveling route, based on the plural traveling positions detected in time series and the interpolation traveling position.

For example, the traveling route generation unit 30 adds the interpolation traveling position on a line which connects between the two traveling positions determined to interpolate with a straight line. The traveling route generation unit 30 decides the number of interpolation traveling positions according to the distance between the two traveling positions determined to interpolate, and adds the decided number of interpolation traveling positions at equal intervals between the two traveling positions. The number of interpolation traveling positions is set to a number such that the interval of the interpolation traveling positions approaches the interval of the two traveling positions when there is no detection missing.

In the example of FIG. 5, two interpolation traveling position Pin1, Pin2 are added between the traveling position P3 and the traveling position P4 determined to interpolate. Then, a traveling route is generated by a plurality of traveling positions P1, P2, . . . , and the two interpolation traveling positions Pin1, Pin2.

The traveling route generation unit 30 accumulates the traveling routes generated in the past in the storage apparatus 91. When the vehicle travels the same road multiple times in the past and a plurality of traveling routes are generated, the traveling route generation unit 30 may perform a statistical processing, such as average processing, to the plurality of traveling routes whose positions are close, and may generate one traveling route after statistical processing. In this case, weights of newer traveling routes may be enlarged and the traveling route may be generated. Alternatively, when the vehicle travels the same road multiple times in the past and a plurality of traveling routes are generated, the traveling route generation unit 30 may determine the newest traveling route as the traveling route corresponding to the road. When transmitting the traveling route to the vehicle control apparatus 200 described below, the traveling route generation unit 30 may transmit the traveling route after statistical processing or the newest traveling route.

1-6. Flowchart

Figure 7:
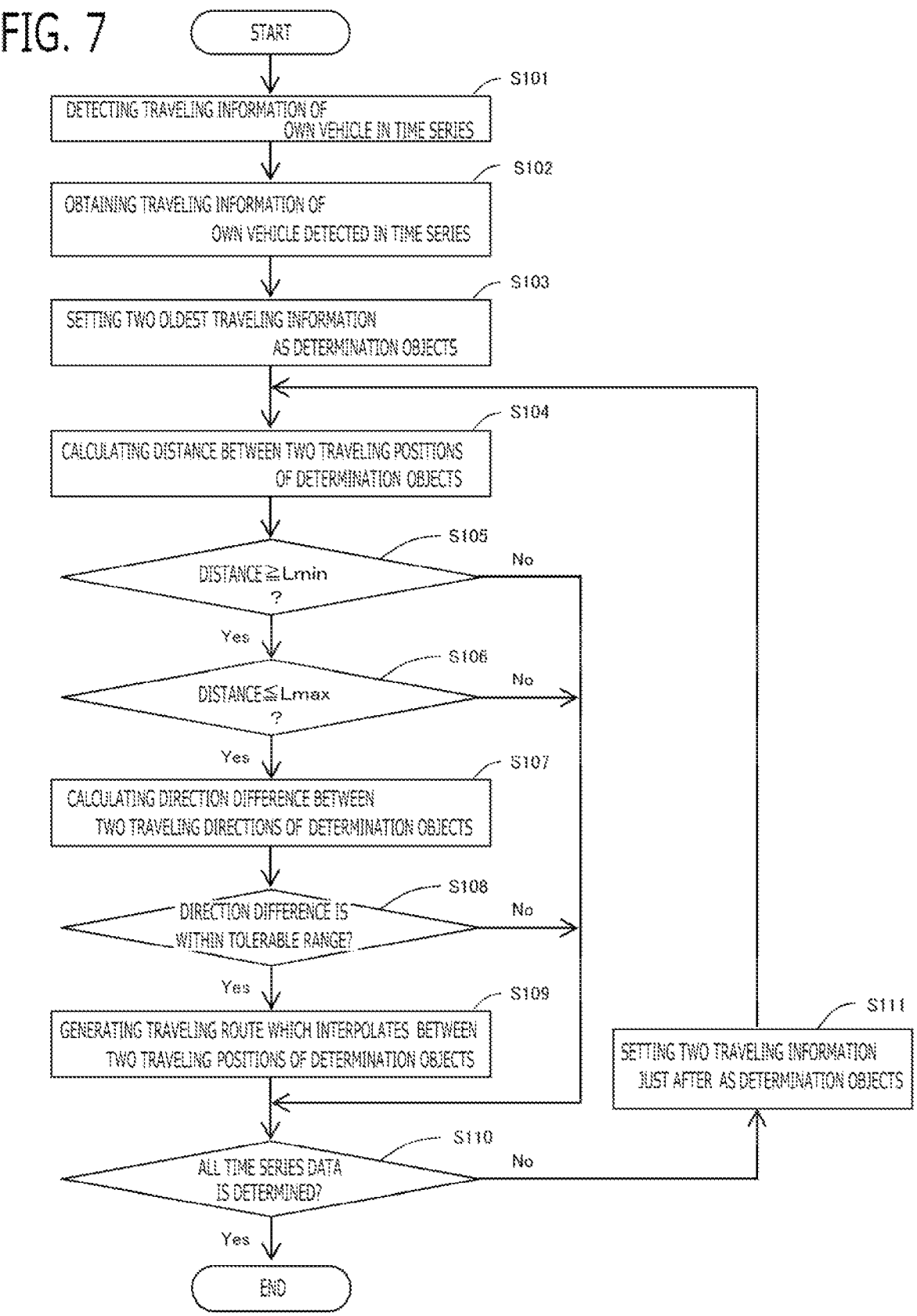
FIG. 7 is a flowchart for explaining the processing of the traveling route generation apparatus according to Embodiment 1.

Next, the flow of processing of the traveling route generation apparatus 100 and the traveling route generation method according to the present embodiment will be explained with reference to the flowchart of FIG. 7. The processing of the flowchart of FIG. 7 is executed by the arithmetic processor 90 executing the software (program) stored in the storage apparatus 91, for example.

In the step S101 (traveling information detection step), as mentioned above, the traveling information detection apparatus 9 detects traveling information of the own vehicle in time series. The traveling position is included in the traveling information at least. In the traveling position, the traveling position detected based on satellite positioning information is included.

Next, in the step S102 (traveling information acquisition step), as mentioned above, the traveling information acquisition unit 10 obtains traveling positions and traveling directions of one object vehicle (in this example, the own vehicle), which were detected in time series. The traveling information acquisition unit 10 obtains the traveling positions of the object vehicle, which were detected in time series based on the satellite positioning information.

In the step S103 to the step S108, the step S110 and the step S111 (traveling information comparison step), as mentioned above, the traveling information comparison unit 20 compares the two traveling positions and the two traveling directions which are temporally before and after relation, and determines whether to interpolate between the two traveling positions.

In the present embodiment, the traveling information comparison unit 20 calculates a distance between the two traveling positions and a direction difference between the two traveling directions which are temporally before and after relation; when the distance between the two traveling positions is within a permission range of distance and the direction difference between the two traveling directions is within a permission range of direction difference, determines to interpolate between the two traveling positions; and otherwise, determines not to interpolate between the two traveling positions.

In the example of the flowchart of FIG. 7, processing is performed sequentially from the old data of time series. In the step S103, as the initial values, the traveling information comparison unit 20 sets two oldest traveling positions and two oldest traveling directions in the traveling information data of time series, as the determination objects.

Then, in the step S104, the traveling information comparison unit 20 calculates the distance between the two traveling positions set as the determination objects in the step S103 or the step S111. Then, in the step S105, the traveling information comparison unit 20 determines whether the distance between the two traveling positions calculated in the step S104 is greater than or equal to the lower limit distance Lmin. When the distance is greater than or equal to the lower limit distance Lmin, it advances to the step S106, and When the distance is not greater than or equal to the lower limit distance Lmin, it is determined not to interpolate between the two traveling positions of the determination objects, and it advances to step the S110. In the step S106, the traveling information comparison unit 20 determines whether the distance between the two traveling positions calculated in the step S104 is less than or equal to the upper limit distance Lmax. When the distance is less than or equal to the upper limit distance Lmax, it advances to the step S107, and When the distance is not less than or equal to the upper limit distance Lmax, it is determined to not to interpolate between the two traveling positions of the determination objects, and it advances to the step S110.

In the step S107, the traveling information comparison unit 20 calculates the direction difference between the two traveling directions set as the determination objects in the step S103 or the step S111. Then, in the step S108, the traveling information comparison unit 20 determines whether the direction difference between the two traveling directions calculated in the step S107 is within the permission range of direction difference. When the direction difference is within the permission range of direction difference, it is determined to interpolate between the two traveling positions of the determination objects, and it advances to the step S109, and when the direction difference is not within the permission range of direction difference, it is determined not to interpolate between the two traveling positions of the determination objects, and it advances to the step S110.

Then, in the step S109 (traveling route generation step), Since it was determined to interpolate between the two traveling positions of the determination objects by the traveling information comparison unit 20 in the step S104 to the step S108, the traveling route generation unit 30 generates the traveling route which interpolates between the two traveling positions determined to interpolate, as mentioned above. In the present embodiment, the traveling route generation unit 30 adds the interpolation traveling position which is a traveling position interpolating between the two traveling positions determined to interpolate.

Then, in the step S110, the traveling information comparison unit 20 determines whether the two traveling positions and the two traveling directions which are currently set as the determination objects are the newest data of the traveling information data of time series. That is to say, the traveling information comparison unit 20 determines whether the obtained all data of time series was determined. When the all data of time series was determined, a series of processing is ended, and when the all data of time series was not determined, it advances to the step SM1.

On the other hand, in the step S111, the traveling information comparison unit 20 sets the determination objects to the two traveling positions and the two traveling directions just after the two traveling positions and the two traveling directions which are set as the determination objects currently, and advances to the step S104.

2. Embodiment 2

Figure 8:
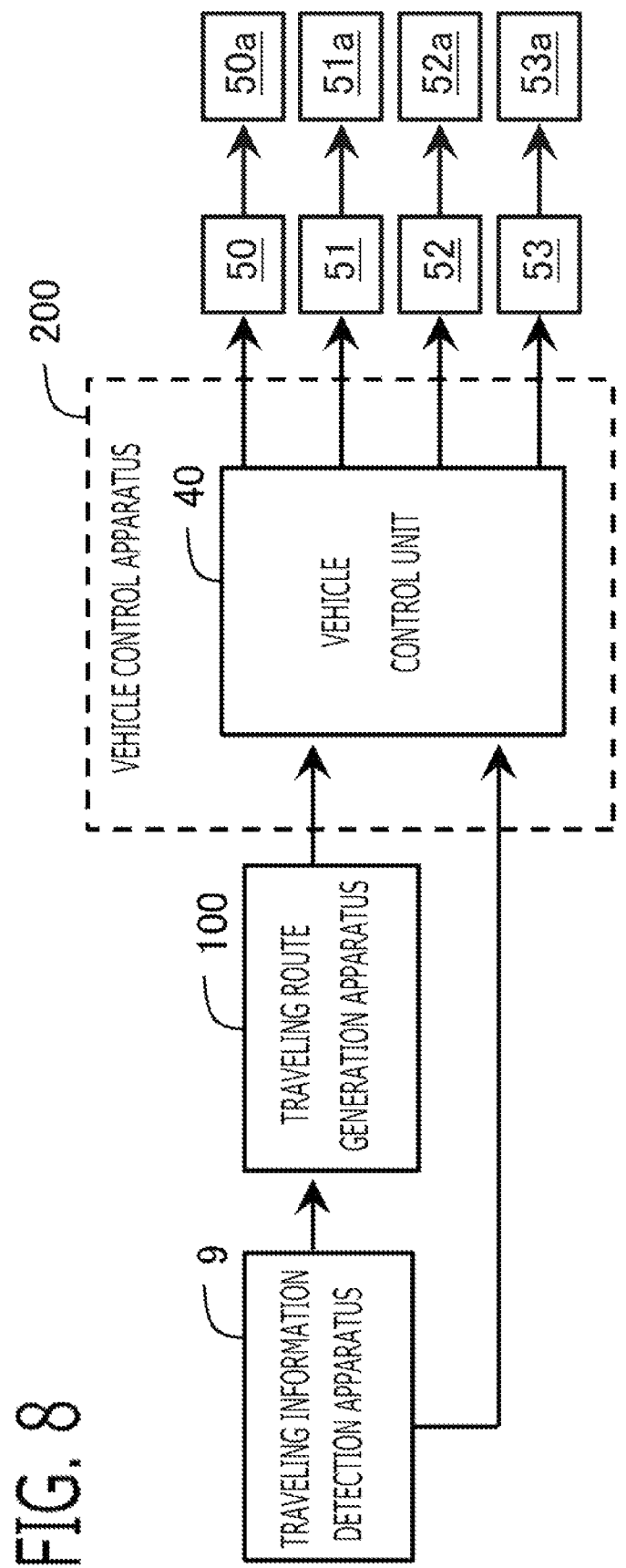
FIG. 8 is a block diagram of the traveling route generation apparatus and the vehicle control apparatus according to Embodiment 1.

Next, the vehicle control apparatus 200 and the vehicle control method according to Embodiment 2 will be explained. FIG. 8 is a block diagram of the traveling route generation apparatus 100 and the vehicle control apparatus 200. Since the traveling route generation apparatus 100 is the same configuration as Embodiment 1, explanation is omitted. The vehicle control apparatus 200 is provided with a processing part, such as a vehicle control unit 40.

Figure 9:
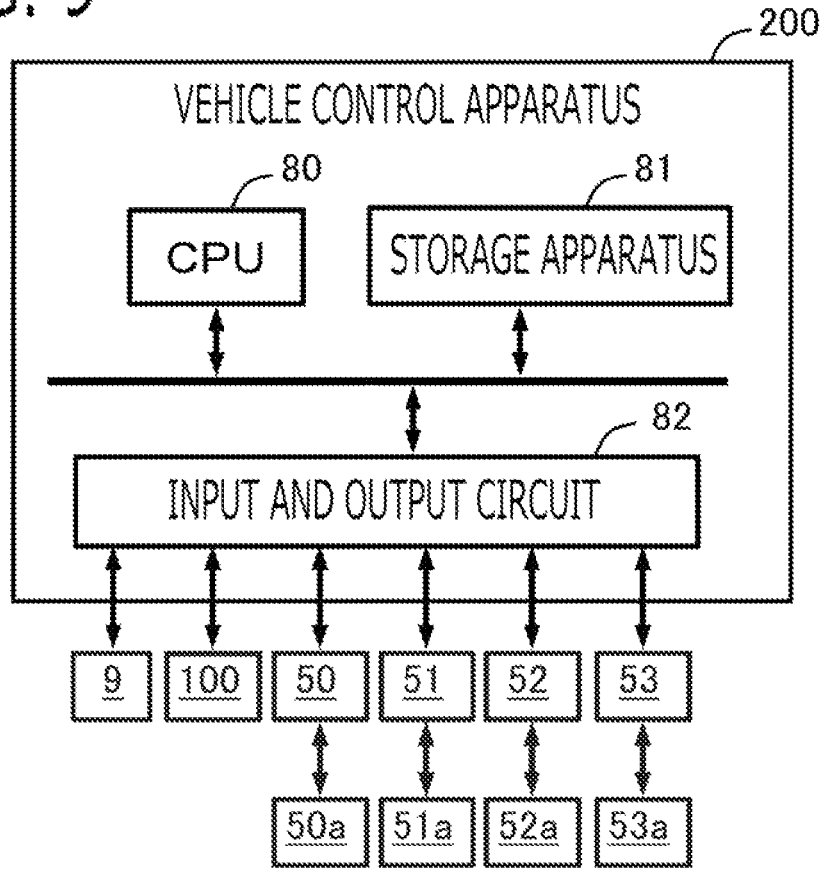
FIG. 9 is a hardware configuration diagram of the vehicle control apparatus according to Embodiment 2.

In the present embodiment, the function of the vehicle control unit 40 and the like of the vehicle control apparatus 200 is realized by the processing circuits including in the vehicle control apparatus 200. For example, the vehicle control apparatus 200 is configured similar to the traveling route generation apparatus 100. As shown in FIG. 9, the vehicle control apparatus 200 is provided, as the processing circuits, with an arithmetic processor (computer) 80 such as a CPU, storage apparatuses 81 which exchange data with the arithmetic processor 80, an input and output circuit 82 which inputs and outputs signals between the arithmetic processor 80 and the external apparatus, and the like.

As the arithmetic processor 80, DSP, the neural processing chip, ASIC, IC, FPGA, various kinds of logical circuits, various kinds of signal processing circuits, and the like may be provided. As the arithmetic processor 80, a plurality of the same type ones or the different type ones may be provided, and each processing may be shared and executed. As the storage apparatuses 81, non-volatile or volatile semiconductor memory, such as RAM, ROM, EPROM, and EEPROM, are provided. The input and output circuit 82 is provided with a communication circuit, an A/D converter, a driving circuit, and the like. As external apparatus, a traveling route generation apparatus 100, the traveling information detection apparatus 9, an automatic steering controller 50, a power controller 51, a brake controller 52, a light controller 53, and the like are provided.

Then, the arithmetic processor 80 runs software items (programs) stored in the storage apparatus 81 such as a ROM and collaborates with other hardware devices, such as the storage apparatuses 81, the input and output circuit 82, and the external apparatus, so that the respective functions of the vehicle control unit 40 and the like provided in the vehicle control apparatus 200 are realized. Various kinds of setting data items to be utilized in the vehicle control unit 40 are stored, as part of software items (programs), in the storage apparatus 81 such as ROM.

Alternatively, similar to FIG. 3, the vehicle control apparatus 200 may be provided with a dedicated hardware as the processing circuit, for example, a single circuit, a combined circuit, a programmed processor, a parallel programmed processor, a neural processing chip, ASIC, FPGA, or a circuit which combined these.

The vehicle control unit 40 controls traveling of the vehicle based on the traveling route generated by the traveling route generation apparatus 100. Similar to the traveling route generation apparatus 100, the vehicle control unit 40 obtains the information of the traveling position, the traveling direction, and like of the current own vehicle from the traveling information detection apparatus 9. Then, the vehicle control unit 40 obtains the traveling route corresponding to the traveling position and the traveling direction of the current own vehicle from the traveling route generation apparatus 100.

Then, the vehicle control unit 40 calculates the target value of the traveling control of vehicle so that the own vehicle travels along with the traveling route. In the target value of the traveling control of vehicle, the target value of steering angle is included, at least. In the target value of the traveling control of vehicle, the target value of travelling speed, the operation command of the direction indicator, and the like may be included.

The vehicle control unit 40 may calculate the target value of the traveling control of vehicle considering state of the own vehicle periphery detected by the periphery monitoring devices, such as the camera and the radar, included in the traveling information detection apparatus 9.

The vehicle control unit 40 transmits the target value of the traveling control of vehicle to the drive controller. The drive controller controls the driving apparatus according to the target value of the traveling control of vehicle. Specifically, the vehicle control unit 40 transmits the target value of steering angle to the automatic steering controller 50. The automatic steering controller 50 controls the electric steering apparatus 50a so that the steering angle of wheel follows the target value of steering angle. The vehicle control unit 40 transmits the target value of travelling speed to the power controller 51 and the brake controller 52. The power controller 51 controls the output of the power machine 51a, such as the internal combustion engine and the motor, so that the travelling speed of the own vehicle follows the target value of travelling speed. The brake controller 52 controls the brake operation of the electric brake apparatus 52a so that the travelling speed of the own vehicle follows the target value of travelling speed. The light controller 53 controls the direction indicator 53a according to the operation command of the direction indicator.

Figure 10:
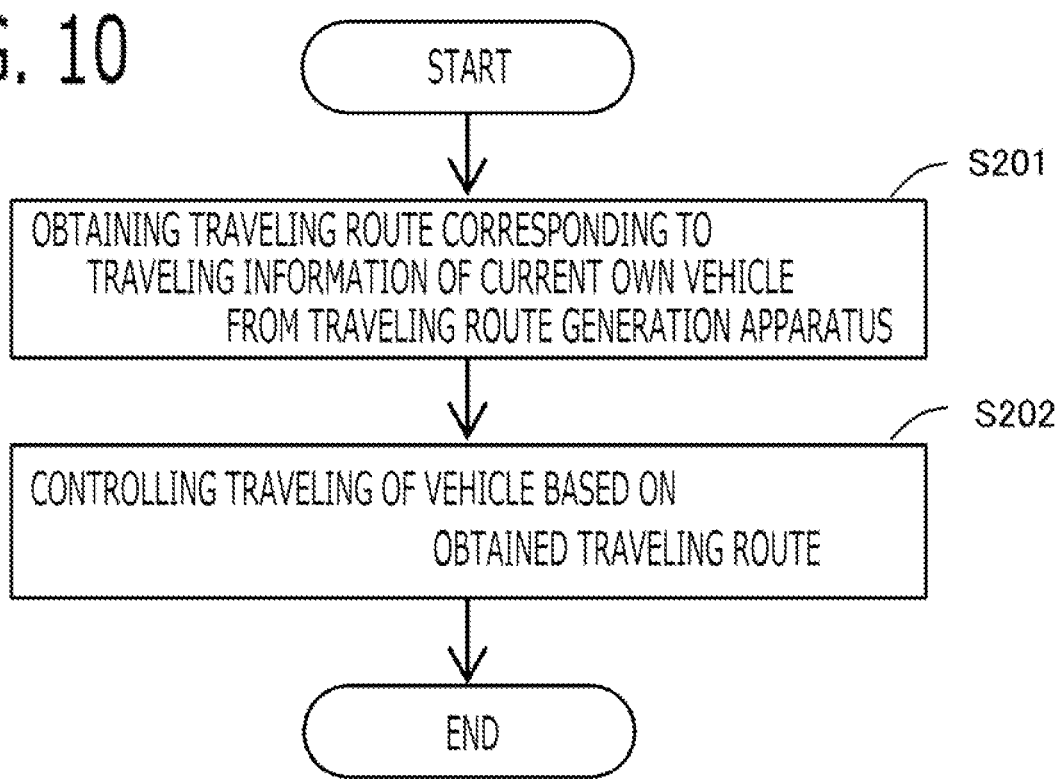
FIG. 10 is a flowchart for explaining the processing of the vehicle control apparatus according to Embodiment 2.

Next, the flow of processing of the vehicle control apparatus 200 and the vehicle control method according to the present embodiment will be explained with reference to the flowchart of FIG. 10. The processing of the flowchart of FIG. 10 is executed by the arithmetic processor 80 executing the software (program) stored in the storage apparatus 81, for example.

In the step S201 (traveling route acquisition step), as mentioned above, the vehicle control unit 40 obtains the traveling route corresponding to the traveling position and the traveling direction of the current own vehicle from the traveling route generation apparatus 100.

In the step S202 (vehicle control step), as mentioned above, the vehicle control unit 40 controls traveling of the vehicle based on the traveling route generated by the traveling route generation apparatus 100. The vehicle control unit 40 calculates the target value of the traveling control of vehicle so that the own vehicle travels along with the traveling route. In the target value of the traveling control of vehicle, the target value of steering angle is included, at least. In the target value of the traveling control of vehicle, the target value of travelling speed, the operation command of the direction indicator, and the like may be included. Then, the vehicle control unit 40 transmits the target value of the traveling control of vehicle to the drive controller, such as the automatic steering controller 50, the power controller 51, the brake controller 52, and the light controller 53. Then, each drive controller controls the driving apparatus, such as the electric steering apparatus 50a, the power machine 51a, the electric brake apparatus 52a, and the direction indicator 53a, according to the transmitted target value of the traveling control of vehicle.

OTHER EMBODIMENTS

Lastly, other embodiments of the present disclosure will be explained. Each of the configurations of embodiments to be explained below is not limited to be separately utilized but can be utilized in combination with the configurations of other embodiments as long as no discrepancy occurs.

(1) In each of the above-mentioned Embodiments, there has been explained the case where the traveling route generation apparatus 100 is mounted on the vehicle, and the object vehicle is the own vehicle on which the traveling route generation apparatus 100 is mounted. However, embodiments of the present disclosure are not limited to the foregoing case. That is to say, the traveling route generation apparatus 100 may be provided in the server connected to the network. And, the object vehicles may be a plurality of vehicles which are connected to the network by the wireless communication and the like, and transmit the traveling positions and the traveling directions of the own vehicle detected in time series to the traveling route generation apparatus 100.

In this case, each vehicle is provided with the traveling information detection apparatus 9, and detects the traveling positions and the traveling directions of the own vehicle in time series. Then, the traveling information detection apparatus 9 is connected to the network via the wireless communication of the wireless communication device mounted on the vehicle, and transmits the traveling positions and the traveling directions of the own vehicle detected in time series to the traveling route generation apparatus 100. Then, using the traveling positions and traveling directions of time series which were obtained from each vehicle, the traveling route generation apparatus 100 compares the two traveling positions and the two traveling directions which are temporally before and after relation, and determines whether to interpolate between the two traveling positions. And, when it is determined to interpolate, the traveling route generation apparatus 100 generates the traveling route which interpolates between the two traveling positions determined to interpolate. Therefore, the traveling route generation apparatus 100 can generate the traveling routes using the traveling information obtained from the plurality of vehicles, and a higher-precision traveling route can be generated in the wider region.

In this case, the vehicle control apparatus 200 mounted on each vehicle is connected to the network via the wireless communication of the wireless communication device mounted on the vehicle, and obtains the traveling route corresponding to the traveling position of the current own vehicle from the traveling route generation apparatus 100 provided in the server, and controls the traveling of vehicle based on the obtained traveling route.

(2) In the above-mentioned Embodiment 2, there has been explained the case where the traveling route generation apparatus 100 and the vehicle control apparatus 200 are different apparatuses. However, the traveling route generation apparatus 100 and the vehicle control apparatus 200 may be one apparatus.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

9: Traveling Information Detection Apparatus, 10: Traveling Information Acquisition Unit, 20: Traveling Information Comparison Unit, 30: Traveling Route Generation Unit, 40: Vehicle Control Unit, 100: Traveling Route Generation Apparatus, 200: Vehicle Control Apparatus, Lmax: Upper limit distance, Lmin: Lower limit distance, V: Width of vehicle, Vs: Travelling speed of vehicle, W: Road width, ΔW: Lateral margin width, θmax: Upper limit direction difference

What is claimed is:

1. A traveling route generation apparatus, comprising:
a vehicle controller;
at least one processor; and
at least one memory including computer program code, which when executed, causes the at least one processor to:
obtain traveling positions and traveling directions, of one object vehicle, which were detected in time series;
compare the two traveling positions and the two traveling directions which are temporally before and after relation, and generate an interpolation determination result by determining whether to interpolate between the two traveling positions;
generate a traveling route which interpolates between the two traveling positions determined to interpolate based on the interpolation determination result; and
the vehicle controller controls traveling of vehicle, based on the traveling route generated;

wherein comparing the two traveling positions comprises:
- calculating a distance between the two traveling positions, and a direction difference between the two traveling directions;
- based on the distance being within a permission range of distance and the direction difference being within a permission range of direction difference, determining to interpolate between the two traveling positions;
- otherwise, determining not to interpolate between the two traveling positions;
- setting a lower limit distance of the permission range of distance, based on a preliminarily set reference time difference between detection times of the two traveling positions and the two traveling directions, and a travelling speed of the object vehicle;
- setting an upper limit distance of the permission range of distance, based on a lateral margin width obtained by subtracting a width of the object vehicle from a road width, and an upper limit direction difference of the permission range of direction difference;
- setting the lateral margin width to ΔW, setting the upper limit direction difference of the permission range of direction difference to θmax, and setting the upper limit distance of the permission range of distance to Lmax; and
- setting the upper limit distance of the permission range of distance by a calculation equation of $$L\text{max} = \Delta W/2/\tan(\theta\text{max})$$

2. The traveling route generation apparatus according to claim 1,
wherein, when it is determined to interpolate adding an interpolation traveling position which is a traveling position interpolating between the two traveling positions determined to interpolate, and generating a traveling route, based on the plural traveling positions detected in time series and the interpolation traveling position.

3. The traveling route generation apparatus according to claim 1,
wherein obtaining traveling positions and traveling directions comprises obtaining the traveling positions of the object vehicle detected in time series, based on satellite positioning information.

4. A traveling route generation method, comprising:
obtaining traveling positions and traveling directions, of one object vehicle, which were detected in time series;
comparing the two traveling positions and the two traveling directions which are temporally before and after relation, and generating an interpolation determination result by determining whether to interpolate between the two traveling positions;
generating a traveling route which interpolates between the two traveling positions determined to interpolate, when it is determined to interpolate; and
controlling traveling of a vehicle, based on the generated traveling route;
wherein comparing the two traveling positions comprises:
- calculating a distance between the two traveling positions, and a direction difference between the two traveling directions;
- based on the distance being within a permission range of distance and the direction difference being within a permission range of direction difference, determining to interpolate between the two traveling positions;
- otherwise, determining not to interpolate between the two traveling positions;
- setting a lower limit distance of the permission range of distance, based on a preliminarily set reference time difference between detection times of the two traveling positions and the two traveling directions, and a travelling speed of the object vehicle;
- setting an upper limit distance of the permission range of distance, based on a lateral margin width obtained by subtracting a width of the object vehicle from a road width, and an upper limit direction difference of the permission range of direction difference;
- setting the lateral margin width to ΔW, setting the upper limit direction difference of the permission range of direction difference to θmax, and setting the upper limit distance of the permission range of distance to Lmax; and
setting the upper limit distance of the permission range of distance by a calculation equation of $$L\text{max} = \Delta W/2/\tan(\theta\text{max}).$$

* * * * *